(12) United States Patent
Tanaka

(10) Patent No.: US 6,382,258 B1
(45) Date of Patent: May 7, 2002

(54) FLEXIBLE TUBE AND METHOD OF MANUFACTURING THE SAME

(75) Inventor: Kazuaki Tanaka, Tokyo (JP)

(73) Assignee: Kakuichi Technical Service Co., Ltd., Tokyo (JP)

( * ) Notice: Subject to any disclaimer, the term of this patent is extended or adjusted under 35 U.S.C. 154(b) by 0 days.

(21) Appl. No.: 09/661,970

(22) Filed: Sep. 14, 2000

(51) Int. Cl.⁷ ................................................. F16L 11/08
(52) U.S. Cl. ...................... 138/130; 138/125; 138/141; 138/144
(58) Field of Search ................................. 138/125, 129, 138/130, 141, 144; 264/149, 151, 159, 160, 171.26

(56) References Cited

U.S. PATENT DOCUMENTS

| | | | | |
|---|---|---|---|---|
| 4,098,298 A | * | 7/1978 | Vohrer | 138/129 |
| 4,830,694 A | * | 5/1989 | Kanao | 138/129 |
| 5,131,325 A | * | 7/1992 | Blauvelt | 138/129 |
| 5,526,849 A | * | 6/1996 | Gray | 138/133 |
| 5,579,809 A | * | 12/1996 | Millward et al. | 138/129 |
| 5,588,469 A | * | 12/1996 | Kakuichi et al. | 138/125 |
| 5,758,694 A | * | 6/1998 | Friedrich et al. | 138/129 |
| 5,918,642 A | * | 7/1999 | Akedo et al. | 138/129 |
| 6,099,925 A | * | 8/2000 | Le Nouveau et al. | 138/129 |

FOREIGN PATENT DOCUMENTS

| | | |
|---|---|---|
| JP | 388632 | 5/1938 |
| JP | 3924100 | 10/1939 |
| JP | 4117097 | 8/1941 |
| JP | 44-30399 | 12/1969 |
| JP | 5031198 | 10/1975 |
| JP | 51119077 | 10/1976 |
| JP | 52-18237 | 5/1977 |
| JP | 5341783 | 10/1978 |
| JP | 5341784 | 10/1978 |
| JP | 55-39342 | 3/1980 |
| JP | 60-10899 | 3/1985 |
| JP | 11108262 | 4/1999 |

* cited by examiner

*Primary Examiner*—James Hook
(74) *Attorney, Agent, or Firm*—Hogan & Hartson, L.L.P.

(57) ABSTRACT

A flexible tube having high flexibility and high resistance to pressure and causing little twist and elongation when subjected to a high internal pressure. A flexible tube 21 has an inner tubular layer 11 made of a soft resin, an inner spiral reinforcement 1 made of a hard resin and helically wound around the inner tubular layer 11, an intermediate tubular layer 12 made of a soft resin and surrounding the inner spiral reinforcement 1, and an outer spiral reinforcement 4 made of a hard resin and helically wound around the intermediate tubular layer 12 in the direction opposite to the winding direction of the inner spiral reinforcement 1. As the direction of the helix of the inner and outer spiral reinforcements 1 and 4 are opposite to each other, forces due to internal pressure acting to twist the helixes are canceled out.

8 Claims, 6 Drawing Sheets

VIEW A

FLEXIBLE TUBE AND METHOD OF MANUFACTURING THE SAME

BACKGROUND OF THE INVENTION

1. Field of the Invention

The present invention relates to a flexible tube and, more specifically, to a flexible tube made of synthetic resins and having outstanding resistance to pressure and high flexibility.

2. Description of the Related Art

As shown in FIG. 6, one conventional flexible tube is composed of a tube wall 33 formed by surrounding a spiral reinforcement 31 made of a hard material with a soft material 32. Such a conventional flexible tube 41 has high flexibility because the reinforcement 31 has a helical shape and the tube wall 33 includes the soft resin portion 32. However, when a pressure of the fluid in the tube increases, the reinforcement 31 is subjected to a strong force which acts to untwist the helix thereof. In such cases, since the tube wall 33 does not have sufficient rigidity to resist the force and since the tube wall 33 including the spiral reinforcement 31 is subjected to large twist and elongation, high internal pressure can not be applied thereto.

Accordingly, it is an object of the present invention to provide a flexible tube having sufficient flexibility and high resistance to internal pressure, wherein the amount of twist and elongation due to internal pressure is small.

SUMMARY OF THE INVENTION

The present invention provides to such a flexible tube as shown in FIG. 1A for example, which comprises:

an inner tubular layer 11 made of a soft resin;

an inner reinforcement 1 made of a hard resin, said inner reinforcement being helically wound around the inner tubular layer 11;

an intermediate tubular layer 12 made of a soft resin, said intermediate tubular layer surrounding the inner reinforcement 1; and an outer reinforcement 4 made a hard resin, said outer reinforcement being helically wound around the intermediate tubular layer 12 in the direction opposite to the winding direction of the inner reinforcement 1.

As a consequence of the above construction, the flexible tube has improved pressure resistance while keeping flexibility. Further, the amount of twist and elongation due to pressure applied by fluid in the flexible tube is small, because the flexible tube includes an inner tubular layer made of a soft resin, an inner spiral reinforcement made of a hard resin, an intermediate tubular layer made of a soft resin and an outer spiral reinforcement made of a hard resin, and because the winding direction of the inner reinforcement and that of the outer reinforcement are opposite to each other.

The flexible tube may be provided with an outer tubular layer 13 made of a soft resin to surround the outer spiral reinforcement. Preferably, the inner tubular layer and the intermediate tubular layer are bonded to each other with the soft resin filling the gap between the spirals of the inner spiral reinforcement.

In another aspect, the present invention provides a flexible tube in which each of the inner and outer reinforcement is in the form of a flat strip. Because of the large proportion of the inner and outer spiral reinforcement relative to the soft resin portion, the flexible tube has high resistance to pressure and the amount of elongation and twist thereof is small.

In still another aspect, the present invention provides such a flexible tube as shown in FIG. 2 for example, which comprises:

an inner tube 14 formed of a first tape 3, the first 3 tape having an inner hard resin reinforcement 1 covered with a soft resin 2, being helically wound, and side end portions of the wound first tape 3 being bonded to each other; and an outer tube 15 formed of a second tape 6, the second tape 6 having an outer hard resin reinforcement 4 covered with a soft resin 5, being helically wound around the inner tube 14 in a direction opposite to the winding direction of the first tape 3, and side end portions of the wound second tape 6 being bonded to each other;

wherein an outer surface 14A of the inner tube 14 and an inner surface 15B of the outer tube 15 are bonded to each other to integrate the inner and outer tubes 14 and 15 into a unitary body as a whole.

Since the flexible tube has a double reinforcement structure which extends through the tube wall of a soft resin and in which inner and outer reinforcements made of a hard resin are helically wound in the opposite direction to each other, there can be accomplished high resistance to pressure, reduced twist and elongation when applied with an internal pressure and excellent bending properties.

In the above flexible tube, the outer reinforcement may be exposed around the periphery. Because the outer reinforcement is exposed around the periphery, the flexibility of the flexible tube is more improved. Also, the flexible tube may be dragged, for example, on the ground with improved slippage.

In a further aspect, the present invention provides a method of manufacturing a flexible tube which comprises:

a first step of covering an inner reinforcement made of a hard resin with a soft resin to form a first tape having side end portions;

a second step of helically winding the first tape and bonding the side end portions of the wound first tape to each other to form an inner tube;

a third step of covering an outer reinforcement made of a hard resin with a soft resin to form a second tape having side end portions;

a fourth step of helically winding the second tape around the inner tube in the direction opposite to the winding direction of the first tape and bonding the side end portions of the wound second tape to each other to form an outer tube; and a fifth step of bonding an outer surface of the inner tube and an inner surface of the outer tube to each other to integrate the inner and outer tubes into a unitary body.

In the above method, a flexible tube having a double reinforcement structure in which inner and outer reinforcements are helically wound in the opposite direction to each other can be manufactured with a high efficiency.

The expression "covering an inner or outer reinforcement with a soft resin" as used herein includes the case where the soft resin covers a part of the reinforcement with the rest portion being exposed on the surface as well as the case where the reinforcement is surrounded by or encapsulated in the soft resin.

The basic Japanese Patent Application No. H2000-048339 filed on Feb. 24, 2000 is hereby incorporated in its entirety by reference into the present application.

The present invention will become more fully understood from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

DESCRIPTION OF THE PREFERRED EMBODIMENTS

Referring in detail to the drawings, the preferred embodiments of the present invention will be described hereinbelow.

Figure 1A:
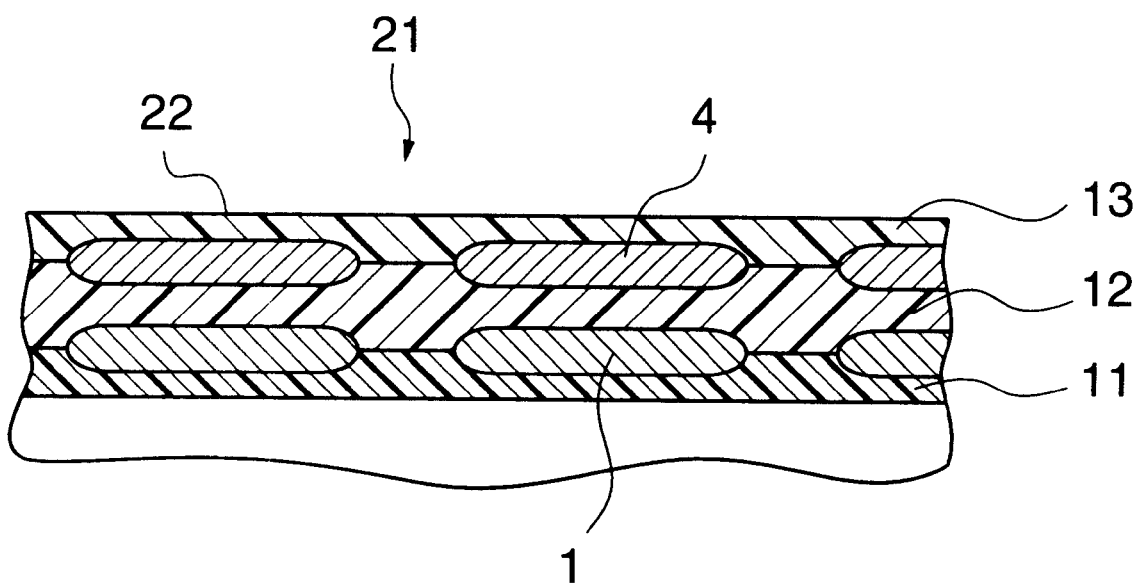
FIG. 1A is a cross-sectional view schematically illustrating the internal structure of a flexible tube according to a first embodiment of the present invention.

FIG. 1A is a-cross-sectional view illustrating the structure of a tube wall 22 of a flexible tube 21 according to a first embodiment of the present invention. The tube wall 22 comprises an inner tubular layer 11 made of a soft resin, innermostly located, an inner spiral reinforcement 1 made of a hard resin and helically wound around the outside of the inner tubular layer 11, an intermediate tubular layer 12 made of a soft resin and surrounding the outside of the inner spiral reinforcement 1, an outer spiral reinforcement 4 made of a hard resin and helically wound around the outside of the intermediate tubular layer 12 in the direction opposite to the winding direction of the inner spiral reinforcement 1, and an outer tubular layer 13 made of a soft resin and surrounding the outside of the outer spiral reinforcement 4. Although lines are drawn, in FIG. 1A, to discriminate the inner tubular layer 11, the intermediate tubular layer 12 and the outer tubular layer 13 from each other, these three layers are integrally formed into a unitary body in reality.

Figure 1B:
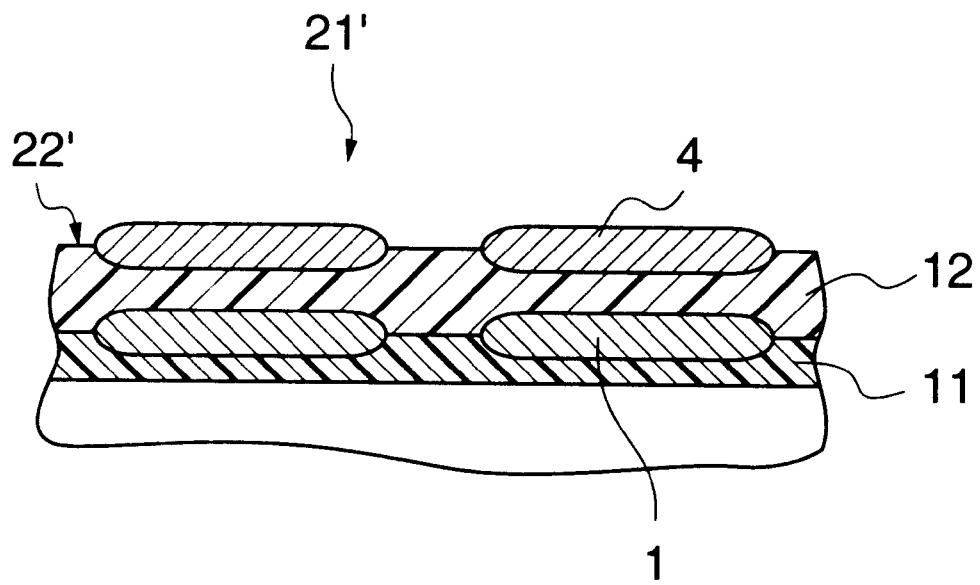
FIG. 1B is a sectional view schematically illustrating the internal structure of a flexible tube according to a second embodiment of the present invention.

FIG. 1B is a cross-sectional view illustrating the structure of a tube wall 22 of a flexible tube 21 according to a second embodiment of the present invention. The flexible tube 21 does not comprise an outer tubular layer 13 of the flexible tube 21. Thus, the outer reinforcement 4 is exposed around the periphery of the flexible tube. Because there is no layer around the outside of the outer reinforcement 4, the flexibility of the flexible tube is more improved. The hard resin is harder than soft resin and, generally, the coefficient of friction of the hard resin is smaller than that of the soft resin. Thus, since the slippage of the periphery of the flexible tube is improved, the flexible tube is easy to handle seven when dragged on the ground, for example.

The thickness of the intermediate tubular layer 12 may be increased to the extent that the exposed portion of the outer reinforcement 4 is smaller than illustrated so that the outer reinforcement 4 is almost buried in the intermediate tubular layer 12 and the outer surface of the outer spiral reinforcement 4 is slightly exposed therefrom. Conversely, the outer surface of the intermediate tubular layer 12 may be flush with the inner surface of the outer reinforcement 4 so that almost the entire outer reinforcement 4 is exposed around the periphery of the flexible tube.

Figure 2:
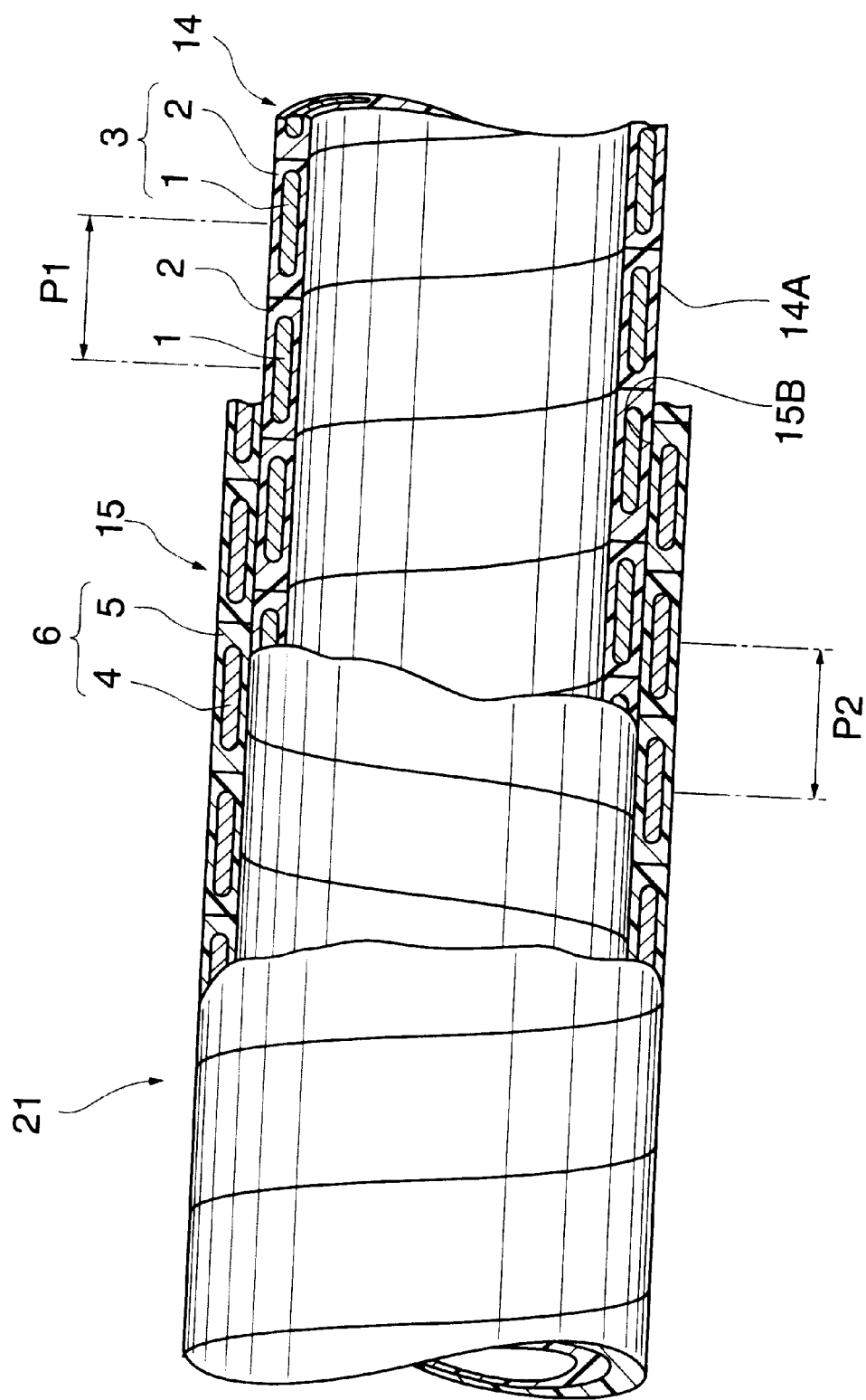
FIG. 2 is a fragmentary view partly in cross section schematically illustrating the flexible tube of FIG. 1A.

In FIG. 2, a fragmentary sectional front view of the flexible tube of a first embodiment according to the present invention is shown. The flexible tube 21 comprises an inner tube 14 which is located inside and an outer tube 15 disposed around the outside of the inner tube. The reason why the inner tube 14 and the outer tube 15 are distinguished here is that the inner tube 14 is formed first and afterwards the outer, tube 15 is formed around the outside of the first tube 14 An outer surface 14A of the inner tube 14 is closely bonded to an inner surface 15B of the outer tube 15 to integrate the inner tube 14 and the outer tube 15 into a unitary body.

The inner tube 14 is formed of a helically wound first tape 3 having a flat rectangular cross-section which is formed by covering an inner reinforcement 1 made of a hard resin and having a flat ellipsoidal cross-section with a soft resin 2. Since the first tape 3 is formed into a spiral shape, the inner reinforcement 1 is also formed into a spiral shape. The inner reinforcement 1 is laterally and vertically centered in the rectangular cross-section of the first tape 3.

The outer tube 15 is formed of a helically wound second tape 6 having a flat rectangular cross-section which is formed by covering an outer reinforcement 4 made of a hard resin and having a flat ellipsoidal cross-section with a soft resin 5. The direction of the helix of the second tape 6 is opposite to that of the first tape 3. In other words, if one of the is wound right-handed, the other is wound left-handed Since the second tape 6 is formed into a helical shape, the outer reinforcement 4 is formed into the same helical shape. The outer reinforcement 4 is laterally and vertically centered in the rectangular cross-section of the second tape 6.

In the drawing, the configuration of the inner and outer tubes 14 and 15 are shown by solid lines to explain that the inner tube 14 and the outer tube 15 are formed by winding the first tape 3 and the second tape 6, respectively. However, since the adjacent side end portions of each of the first and second tapes 3 and 6 are closely bonded to each other to form a tubular shape, such boundaries as shown by solid lines do not exist in a completed flexible tube in reality. Also, since the outer surface 14A of the inner tube 14 and the inner surface 15A of the outer tube 15 are closely bonded to each other to integrate the inner and outer tubes 14 and 15 into a tube, such boundaries as shown by solid lines in the drawing do not exist between the inner and outer tubes 14 and 15 in reality.

Although the cross-section of the inner and outer reinforcements 1 and 4 were described as of a ellipsoidal shape, it may be of a rectangular shape with the long sides parallel to the longitudinal direction of the flexible tube, or may be of an elliptic shape formed by extending the short sides of the above rectangle outward and rounding the corners.

Because the inner and outer reinforcements 1 and 4 are wound in the opposite direction to each other in the flexible tube 21 according to a first embodiment of the present invention, forces due to internal pressure which act to twist the flexible tube 21 are canceled out. Thus, the flexible tube 21 has an improved resistance to pressure, and higher effectiveness in preventing twist and elongation is obtained. Additionally, the flexible tube 21 has bending properties as a flexible tube, and higher restoring properties compared to known wired hoses and suction hoses. Because the inner and outer reinforcement 1 and 4 are laterally and vertically centered in the first tape 3 and the second tape 6, respectively, and a soft resin layer (the intermediate tubular layer 12) is interposed between the inner and outer reinforcements 1 and 4, the flexible tube 21 has flexibility. For further prevention of elongation due to internal pressure, reinforcing threads may be disposed in the flexible tube 21 according to this embodiment, especially in the soft resin layers thereof (the inner tubular layer, the intermediate tubular layer or the outer tubular layer). Also, metal wires, may not be employed as reinforcements, and in that case the flexible tube 21 is light in weight.

It is desirable that the first and second tape 3 and 6 have the same size, especially the same width because twist can be effectively prevented. In this case, the pitch P1 of the helix of the inner reinforcement 1 and the pitch P2 of the helix of the outer reinforcement 4 are equivalent. In this embodiment, the tapes are formed in two layers, but more layers of tapes may be used with the direction of helix of hard resin reinforcements changed alternately. Also, it is preferable that the first and second tapes 3 and 6 are of the same design including the size and the material because the manufacturing process can be simplified.

The bending properties, and the amount of twist and elongation due to internal pressure can be adjusted by varying the pitch P1 of the inner reinforcement 1 and the pitch P2 of the outer reinforcement 4. Likewise, in the case where more than two layers of reinforcements are provided, the bending properties, and the amount of twist and elongation due to internal pressure can be adjusted by varying the pitch of the reinforcement of each tape. For example, by narrowing the pitch P2 of the outer reinforcement 4 in respect to the pitch 1 of the inner reinforcement 1, twist can be prevented more effectively.

Conventional hard material tubes are short in length and require a number of joints. Thus, a lot of work of jointing tubes is needed at the time of installation and all the more time and manpower are needed for it. Also, there are a lot of restrictions in designing because standardized elbows are usually used for bent sections. With regard to these problems, the flexible tube 21 according to this embodiment can save a lot of trouble in jointing tubes and the number of joints because it can be manufactured in any length in practical use. Additionally, since the flexible tube 21 can be wound, it is convenient when it can not be transported in an elongated condition.

Figure 3:
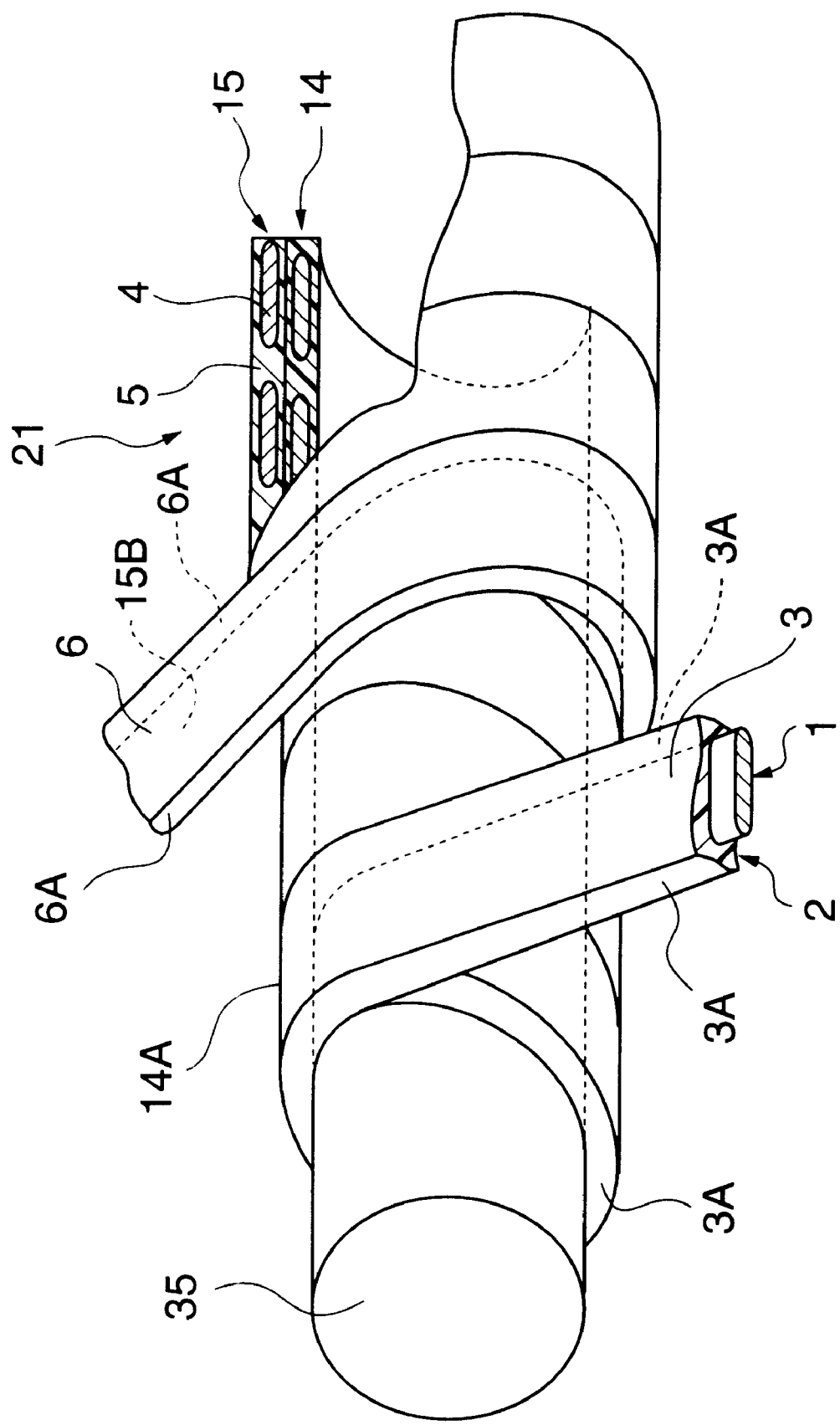
FIG. 3 is a perspective view schematically illustrating a method of manufacturing a flexible tube according to a third embodiment of the present invention.

Referring to FIG. 3, a method of manufacturing a flexible tube according to a third embodiment of the present invention will be described. In this example, the first tape 3 is helically wound into a right-handed (clockwise) direction and the second tape 6 is helically wound into a left-handed (counterclockwise) direction, as seen from the left in the drawing.

In a method of manufacturing according to the third embodiment of the present invention, the first and second tapes 3 and 6 are formed as strips at first and afterwards they are formed into a tube. Here, a method of manufacturing the first and second tapes 3 and 6 will be described. An inner reinforcement 1 made of a hard resin and formed into a long length of strip is covered with a soft resin 2 to form a long length of first tape 3 (the first step), which is then wound on a reel (not shown). In the same manner, an outer reinforcement 4 made of a hard resin and formed into a long length of strip is covered with a soft resin 5 to form a long length of second tape 6 (the second step), which is then wound on another reel. In the first tape 3 and the second tape 6, preferably, each of the hard resin reinforcements 1 and 4 is integrated with the soft resins 2 and 5 covering the reinforcements 1 and 4, respectively, by co-extruding. Because the reinforcement 1 is integrally bonded to the soft resins 2 and the reinforcement 4 is integrally bonded to the soft resins 5, resistance to pressure of the flexible tube 21 is improved.

Then the first tape 3 is unwound from the reel and helically wound around a cylindrical mandrel 35 (in a right-handed (CW) direction, as seen from the left in the drawing). Before or while being wound around the mandrel 35, the first tape 3 is heated until the soft resin portion 2 melts or softens to some extent. "To some extent" means to such an extent that two portions of it will be bonded to each other when closely attached. Then, side end portions 3A of the tape are closely bonded to each other to form the inner tube 14 (the second process). Although the end of the mandrel 35 in the right-hand of the drawing is not shown, it extends into the completed flexible tube to some point in reality. Also, although the other end of the mandrel 35 in the left-hand of the drawing is shown as cut partway, it is coupled to a rotating driver (not shown) in reality.

Then the second tape 6 is helically wound around the outside of the inner tube in the direction opposite to the winding direction of the first tape 3 (in a left-handed direction (CCW), as seen from the left in the drawing). Before or while being wound around the inner tube 14, the second tape 6 is heated until the soft resin portion thereof melts to some extent. Then, both side end portions 6A of the tape 6 are closely contacted to be bonded to each other and to form the outer tube 15 (the fourth step). At this time, if the soft resin portion of the inner tube is melted or softened to some extent, the outer surface 14A of the inner tube 14 and the inner surface 15B of the outer tube 15 can be bonded to each other simultaneously with the formation of the outer tube 15 In this manner, the inner and outer tubes 14 and 15 are integrated into a tube as a whole.

Figure 4:
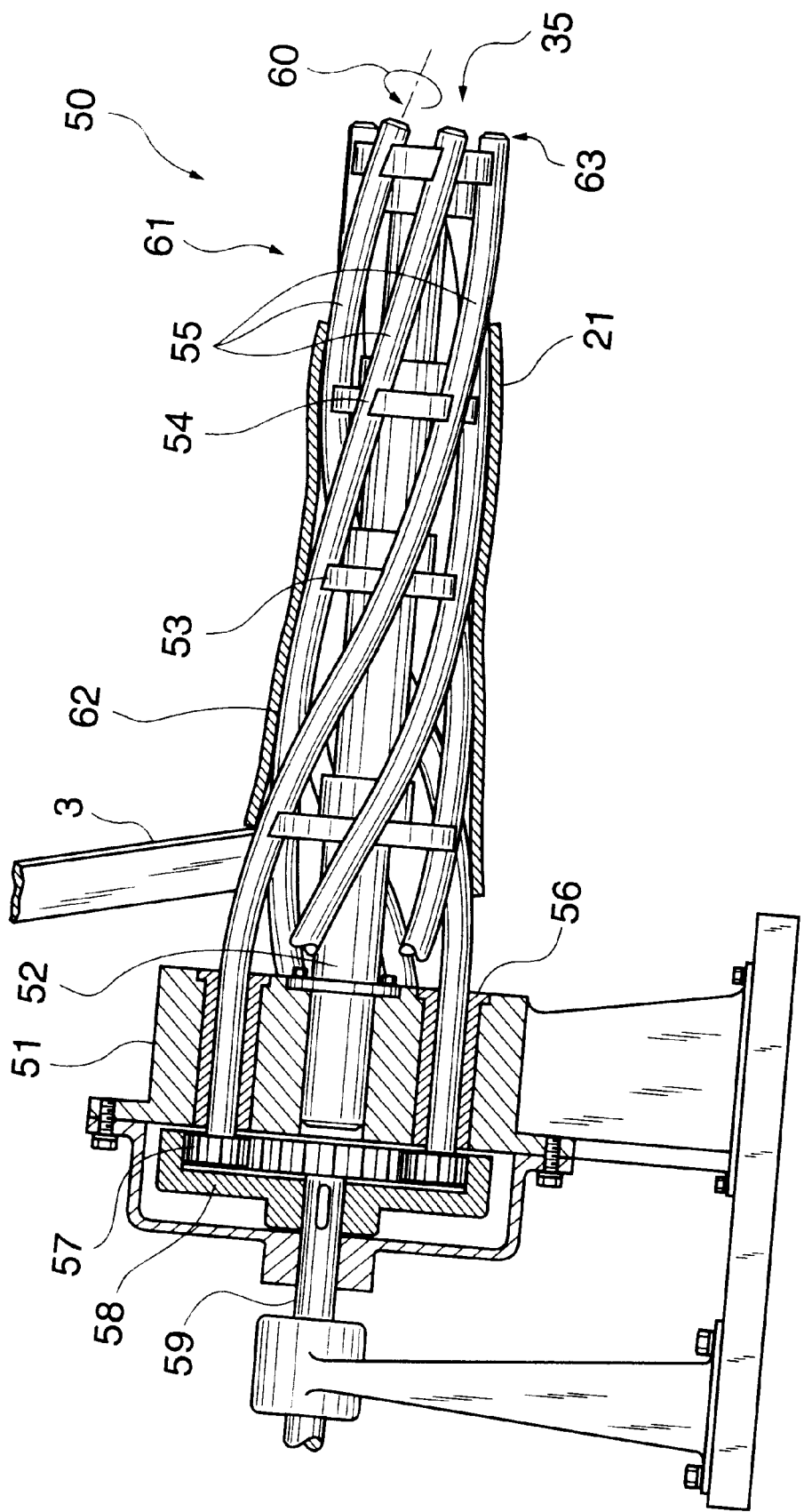
FIG. 4 is a cross-sectional, elevational view diagrammatically illustrating an example of an equipment for manufacturing a flexible tube 21.

Referring to FIG. 4 which is an elevational cross-sectional view illustrating a device 50 for manufacturing the flexible tube, a basic method of manufacturing the flexible tube embodying the present invention will be described further in detail. In the above description, the mandrel is of described as being cylindrical. In factual, however, the mandrel is of a construction as shown in FIG. 4. As shown in the drawing, a housing, 51 installed on a base has a central axle 52 extending horizontally in the fashion of a cantilever for supporting the inner tube 14 of the flexible tube 21 from the inside, A plurality of bearing members 53 are attached to the central axle 52 and arranged with a suitable space each other along the axial direction thereof. Each of the bearing members 53 has a polygonal shape, such as hexagon, and has a central opening through which the central axle 52 extends and fixed to the axle. At the apexes of the polygons of the bearing members 53, bearing parts 54 are formed. The bearing parts 54 rotatably support flexible rods 55 made of a spring steel. All the portions of the bearing members 53 are positioned fully inside an envelope enveloping a plurality (six, for example) of the flexible rods 55. The bearing members 53 may be of a circular shape instead of the polygonal shape.

The bearing parts 54 are arranged in an angular direction with a slight offset at a given angle about the axle 52 so that each of the flexible rods 55 forms a gentle helix from the side of housing 51 toward the other end. Also, the sizes of the plurality of the bearing members 53 become smaller from the side of the housing 51 toward the end of the central axle 52. Thus, an envelope 62 of a group 61 of the plurality of the flexible rods 55 is in a shape of a truncated cone which slopes toward the end of the central axle 52 from the side of the housing 51. The smaller diameter side of the truncated cone provides an end 63 of the mandrel 35.

The housing 51 side of the flexible rods 55 are rotatably supported by a plurality of bearings 56 installed into the housing 51, respectively. At each end of the flexible rods 55 inserted into the housing 51, a small gear 57 is secured. The small gears 57 are meshed with a large gear 58. The large gear 58 has a rotational shaft 59 supported by the housing 51 in such a manner as to rotate about the same axis as the central axle 52 and is rotatably driven by a driving device (not shown).

Next, a method of manufacturing a flexible tube using the manufacturing device 50 will be described. First, the inner tube 14 is formed. Upon actuation of the driving device, the axle 59 rotates together with the large gear 58 so that each of the small gears 57 engaged with the large gear 58 rotates. As a result, each of the flexible rods 55 rotates in the direction shown by the arrow 60 in FIG. 4 with their helixes being maintained. In other words, the whole envelope 62 (truncated conical shape) of the flexible rods 55 rotates. While rotating, the envelope 62 behaves as if it moved from the larger diameter side to the smaller diameter side.

The first tape 3, which has been heated to soften, is fed to the larger diameter side (the housing side) of the envelope 62 of the flexible rods 55. The first tape 3 is fed in a direction at right angle to the flexible rods 55. As the flexible rods 55 are each formed into a helical shape as described before, the tape 3 is helically wound along the envelope 62 from the larger diameter side of the truncated cone toward the small diameter side i.e. the end 63 side. The side portions 3A of thus wound first tape 3 are bonded to each other to form the inner tube 14. As being wound, the inner tube 14 is gradually cooled enough to maintain the shape, and, eventually leaves the end 63 as a continuously long inner tube 14.

Figure 5A:
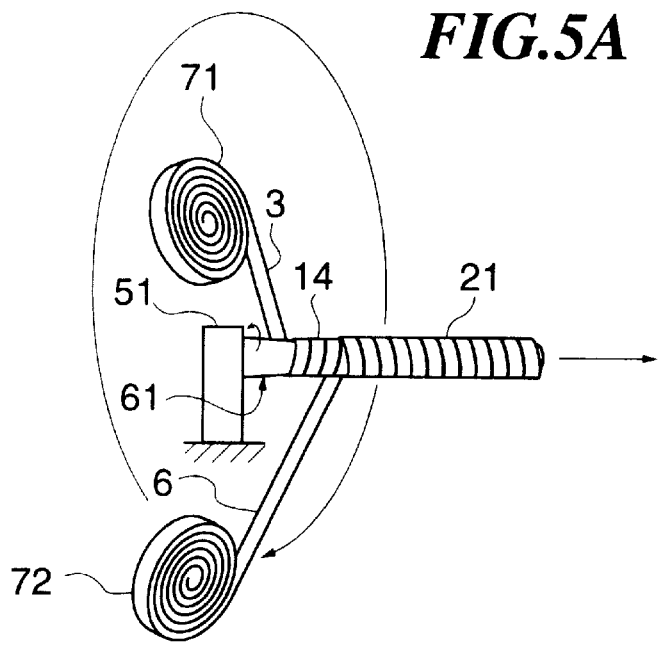
FIG. 5A–FIG. 5D are conceptual illustrations illustrating methods of manufacturing flexible tubes according to third to fifth embodiments of the present invention.

A method of manufacturing the flexible tube 21 by forming the outer tube 15 around the outside of the inner tube 14 made as above according to a third embodiment of the present invention will be described with reference to the conceptual drawing shown in FIG. 5A. The first tape 3 is unwound from the reel 71 and formed into the inner tube 14 with the device shown in FIG. 4. On the other hand, the reel 73 on which the second tape 6 has been wound is constructed to be rotated around the whole device including a group of flexible rods group 61 by a driving device (not shown) at twice the speed of that of the inner tube that is being prepared. Thus, the outer tube 15 is formed around the outside of the completed inner tube 14 almost simultaneously, and, the flexible tube 21 is continuously manufactured as a whole.

Figure 5B:
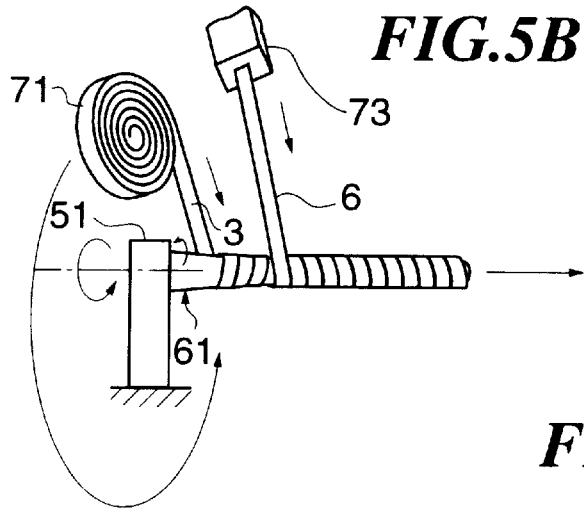
Figure 5D:
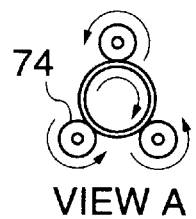

Next, a method of manufacturing a flexible tube according to a forth embodiment of the present invention will be described with reference to a conceptual drawing FIG. 5B. In the method of the third embodiment, both the first tape 3 and the second tape 6 are wound on reels 71 and 72, and then wound around the mandrel 35 while being unwound from the reel 71 and 72. However, in a method of manufacturing according to the fourth embodiment, only the first elongated tape 3 is wound around the reel 71 and then wound around the mandrel 35 while being unwound from the reel 71 similar to the manufacturing method of third embodiment. The second tape 6 prepared by co-extrusion of the hard resin reinforcement 4 and the soft resin 5 through a nozzle 73 is wound around the inner tube 14.

Namely, the first elongated tape 3 is wound around the reel 71. While heating the soft resin 2 of the first tape 3 to soften same and to enable the bonding to each other, the first tape 3 is helically wound around the mandrel 35. While rotating the mandrel 35 and the reel 71 in one direction (clockwise as seen from left in FIG. 5B), the second tape 6, which is as produced and the soft resin 5 of which has not yet been solidified, is helically wound in the other direction (in the direction opposite to the winding direction of the first tape 3) on an outer surface of the inner tube 14, thereby obtaining the flexible tube 21. With this method, it is easy to rotate the first tape 3 around the mandrel 35, since the tape 3 is wound around the reel 71.

The above embodiment may be modified in such a manner that the second tape 6 wound around the reel 72 is unwound therefrom and wound around the inner tube 14 while rotating the reel 72, whereas the first tape 3 is wound around the mandrel 35 as it is prepared by co-extrusion. Namely, the reel 71 may be replaced with the nozzle 73 in the third embodiment as shown in FIG. 5A.

Figure 5C:
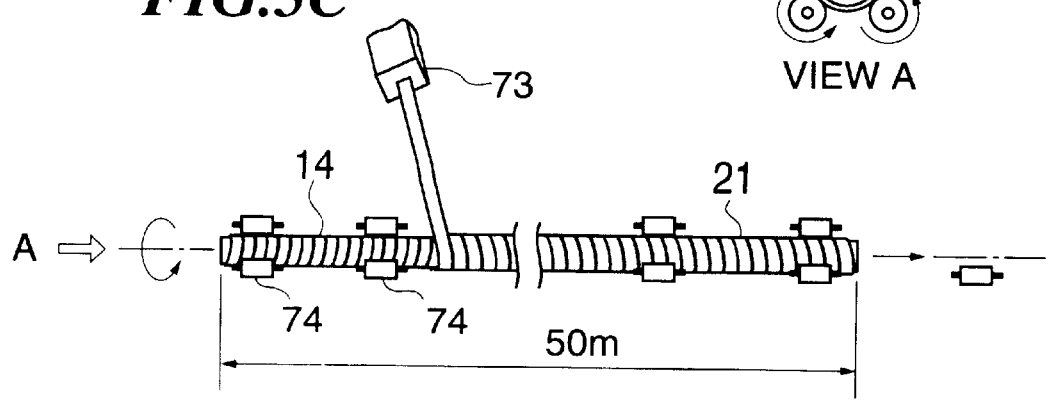
Figure 6:
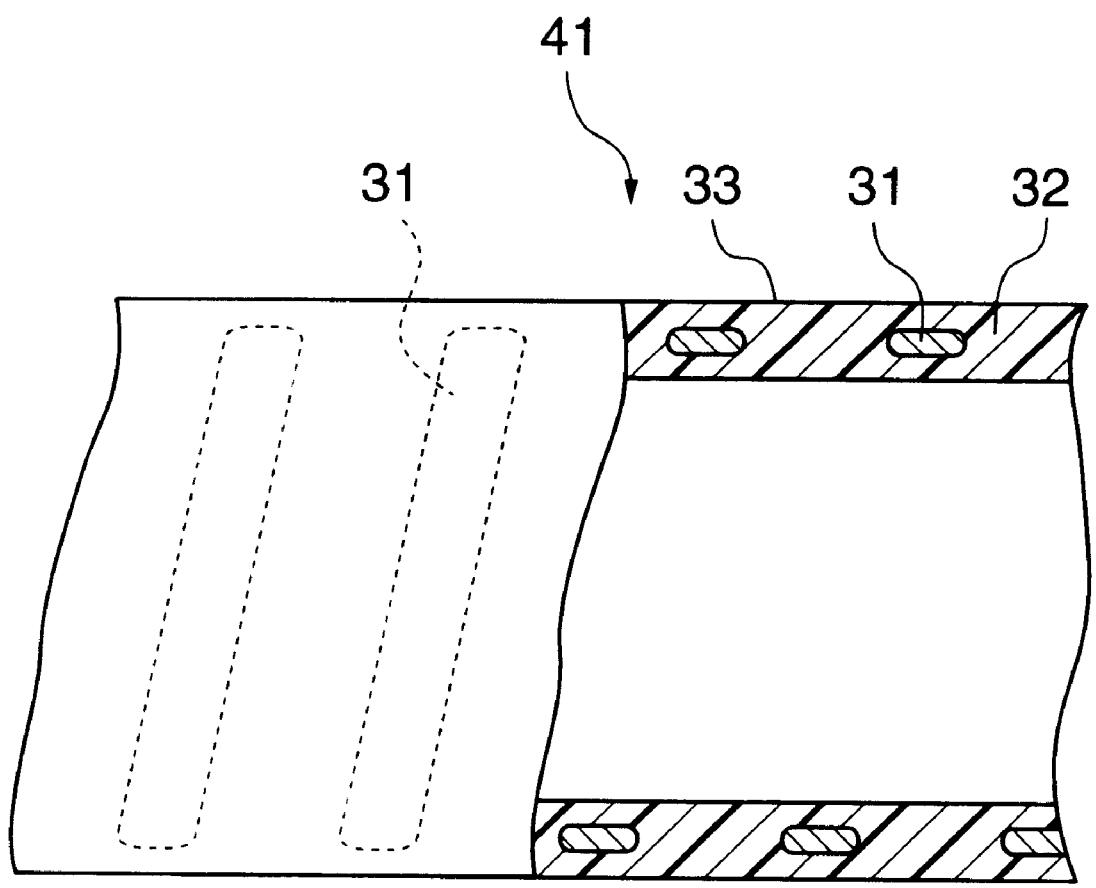
FIG. 6 is a schematic illustration, partly in cross section, of a conventional flexible tube.

A fifth embodiment of the present invention will be next described with reference to the conceptual drawing of FIG. 5C. In this method, the first and second tapes 3 and 6 as produced by co-extrusion of the reinforcing resin and the soft resin are wound around the mandrel 35 or the inner tube 14, respectively. In this case, the bonding of the side end portions of the first tape 3 to form the inner tube 14 (second step) can be performed by simply winding the first tape 3 around the mandrel before the molten soft resin 2 of the tape 3 produced in the first step has been solidified.

In this case, after the inner tube 14 having a length of, for example, 50 m has been prepared, the tape 3 is cut. The inner tube is then placed with the positions of their both ends being reversed. Thus, as the fourth step, the second tape 6 is helically wound around the inner tube 14 in the opposite direction. The 50 m long inner tube 14 is placed on, for example, a pair of rollers 74 disposed symmetrically with respect to the vertical line. The distance between the peripheries of the paired rollers 74 is smaller than the outside diameter of the inner tube 14. Another roller to suppress an upper part of the inner tube 14 may be disposed at a position of the top of an isosceles triangle, the base of which is on a line formed by connecting the centers of the paired rollers 74. The roller 74 rotates in a CCW direction so that the inner tube 14 rotates in a CW direction as seen from the left in the drawing (so that the outer tube 15 forms a helix wound in the direction opposite to the inner tube 14).

The 50 m long inner tube 14 is placed on a plurality of sets of a pair of rollers and a top roller disposed in series. With the rotation of rollers 74, the inner tube 14 rotates in a CW direction. Each axis of rotation of the paired rollers and the top roller is almost parallel to the central axis of the inner tube 14 but is slightly inclined so that the inner tube 14 proceeds in the direction of the central axis thereof (rightward in the drawing (a direction of the arrow)) with the rotation.

The second tape 6 is wound around the inner tube 14 while being prepared by co-extruding the reinforcement made of a hard resin and the soft resin from the nozzle 73. Since the inner tube 14 proceeds in the direction of the central axis thereof (a direction of the arrow in the drawing) with rotation; the outer tube 15 is formed around the inner tube 14 with the proceeding thereof.

Bonding of the outer surface 14A of the inner tube 14 to the inner surface 15B of the outer tube 15 may be accomplished by, for example, heating the inner tube 14 to soften same and then winding the second tape 6 around the outer surface 14A of the inner tube 14 before the soft resins 2 and 5 have been solidified.

A hard resin has a higher modulus of longitudinal elasticity, i.e. a coefficient obtained by dividing a stress by a strain caused by the stress, as compared with that of a soft resin. In other words, the strain caused in the hard resin by a given stress is smaller than that caused by the same stress in the soft resin. Accordingly, by using the hard resin as a reinforcement, the amount of deformation of the flexible tube can be reduced. On the other hand, since the strain caused in the soft resin by a given stress is greater than that caused by the same stress in the hard resin, the flexible tube can obtain flexibility by using the soft resin as a material for covering the reinforcement or as a material of the tube wall.

Generally, hard resins have a higher tensile strength than soft resins. In other words, hard resins need a larger stress to break than that required for soft resins. Thus, in the case where a hard resin is employed as a reinforcement, the pressure-resisting performance of the flexible tube can be improved.

It is preferred that the combination of the soft resins 2 and 5 for the first tape 3 and the second tape 6 with the hard resins for the spiral reinforcements 1 and 5 is such as to permit the co-extrusion. Preferred examples of the combination include a combination of a soft polyvinyl chloride resin with a hard polyvinyl chloride resin, a combination of a soft polyolefin resin with a polypropylene resin and a combination of a polyurethane resin with a polyamide resin (nylon).

In the above embodiment, the soft resins are bonded to each other by softening or melting the soft resins to a certain degree. However, the soft resins can be bonded to each other using an adhesive.

As described in the foregoing, since the flexible tube according to the present invention has an inner tubular layer made of a soft resin, an inner reinforcement made of a hard resin, an intermediate tubular layer made of a soft resin, and an outer spiral reinforcement made of a hard resin and since the winding directions of the inner and outer spiral reinforcements are reversed, the pressure-resisting performance of the flexible tube is improved so that the twist and elongation thereof caused by a pressurized fluid contained therein can be minimized. Yet, the flexible tube has improved flexibility.

What is claimed is:

1. A flexible tube comprising:
    an inner tubular layer made of a soft resin;
    an inner reinforcement made of a hard resin, said inner reinforcement being helically wound around said inner tubular layer;
    an intermediate tubular layer made of a soft resin, said intermediate tubular layer surrounding said inner reinforcement; and
    an outer reinforcement made of a hard resin, said outer reinforcement being helically wound around said intermediate tubular layer in the direction opposite to the winding direction of said inner reinforcement.

2. A flexible tube as recited in claim 1, wherein each of said inner and outer reinforcements is in a form of a flat strip.

3. A flexible tube as recited in claim 1, wherein said outer spiral reinforcement is exposed around an outer periphery of said flexible tube.

4. A flexible tube comprising:
    an inner tube formed of a first tape, said first tape having an inner hard resin reinforcement covered with a soft resin, being helically wound, and side end portions of said wound first tape being bonded to each other; and
    an outer tube formed of a second tape, said second tape having an outer hard resin reinforcement covered with a soft resin, being helically wound around said inner tube in a direction opposite to winding direction of said first tape, and side end portions of said wound second tape being bonded to each other;
    wherein an outer surface of said inner tube and an inner surface of said outer tube are bonded to each other to be integrated into a unitary body.

5. A flexible tube as recited in claim 4, said outer spiral reinforcement is exposed around an outer periphery of said flexible tube.

6. A flexible tube as recited in claim 4, wherein said first tape and said second tape have the same width.

7. A method for manufacturing a flexible tube comprising the steps of:
    covering an inner reinforcement made of a hard resin with a soft resin to form a first tape having side end portions;
    helically winding said first tape and bonding the side end portions of said wound first tape to each other to form an inner tube;
    covering an outer reinforcement made of a hard resin with a soft resin to form a second tape having side end portion;
    helically winding said second tape around said inner tube in the direction opposite to the winding direction of said first tape and bonding the side end portions of said wound second tape to each other to form an outer tube; and
    bonding an outer surface of said inner tube and an inner surface of said outer tube to each other to integrate said inner and outer tubes into a unitary body.

8. A method of manufacturing a flexible tube as recited in claim 7 further comprising:
    a step of cutting said first tape after said inner tube has been formed to have a predetermined length in said second step;
    wherein, in said fourth step, said second tape is wound around said inner tube having said predetermined length.

* * * * *